(12) United States Patent
Shin et al.

(10) Patent No.: US 6,228,262 B1
(45) Date of Patent: May 8, 2001

(54) POLYSULFONE BASED HOLLOW FIBER MEMBRANE, AND A PROCESS FOR PREPARING THE SAME

(75) Inventors: He Kuk Shin, Seoungnam; Chul Hu, Yongin, both of (KR)

(73) Assignee: Kolon Industries, Inc., Kyunggi-do (KR)

( * ) Notice: Subject to any disclaimer, the term of this patent is extended or adjusted under 35 U.S.C. 154(b) by 0 days.

(21) Appl. No.: 09/220,790

(22) Filed: Dec. 28, 1998

(30) Foreign Application Priority Data

Dec. 30, 1997 (KR) ................................................ 97-79118
Dec. 30, 1997 (KR) ................................................ 97-79120

(51) Int. Cl.$^7$ ................................................ B01D 69/08
(52) U.S. Cl. ............................ 210/500.23; 210/500.41; 210/500.42; 264/48; 264/49; 264/178 R
(58) Field of Search ........................ 210/500.27, 500.41, 210/500.42, 500.23; 264/41, 48, 49, 178 R, 211.14; 428/378, 209.1, 177 F, 200; 96/10

(56) References Cited

U.S. PATENT DOCUMENTS

| | | | |
|---|---|---|---|
| 4,342,711 | * 8/1982 | Joh et al. | 264/41 |
| 4,813,983 | * 3/1989 | Nohmi et al. | 428/378 |
| 5,340,480 | * 8/1994 | Kawada et al. | 210/500.23 |
| 5,436,068 | * 7/1995 | Kobayashi et al. | 210/500.23 |
| 5,543,465 | * 8/1996 | Bell et al. | 264/48 |
| 5,762,798 | * 6/1998 | Wenthold et al. | 210/500.23 |
| 5,871,680 | * 2/1999 | Macheras et al. | 264/211.14 |

* cited by examiner

*Primary Examiner*—Ana Fortuna
(74) *Attorney, Agent, or Firm*—Birch, Stewart, Kolasch & Birch LLP

(57) ABSTRACT

The present invention relates to produce a polysulfone based hollow fiber membrane, having high water permeable coefficient and excellent permeability with no deterioration of separation capability, characterized by using an internal coagulating liquid and/or an external coagulating liquid containing diethylene glycol(DEG) and/or salt which can form a hydrate in the process of producing the polysulfone based hollow fiber membrane by following steps:

(a) Extrude a spinning dope comprising polysulfones resin, organic solvent and polyvinyl pyrrolydone(PVP) into air through a biannular spinning nozzle to obtain an extrudate in the form of a hollow fiber, (b) Simultaneously inject an internal coagulating liquid into the biannular spinning nozzle at inside bore thereof, and (c) Subsequently introduce said extrudate to an external coagulating liquid.

5 Claims, 1 Drawing Sheet

[ FIG 1 ]
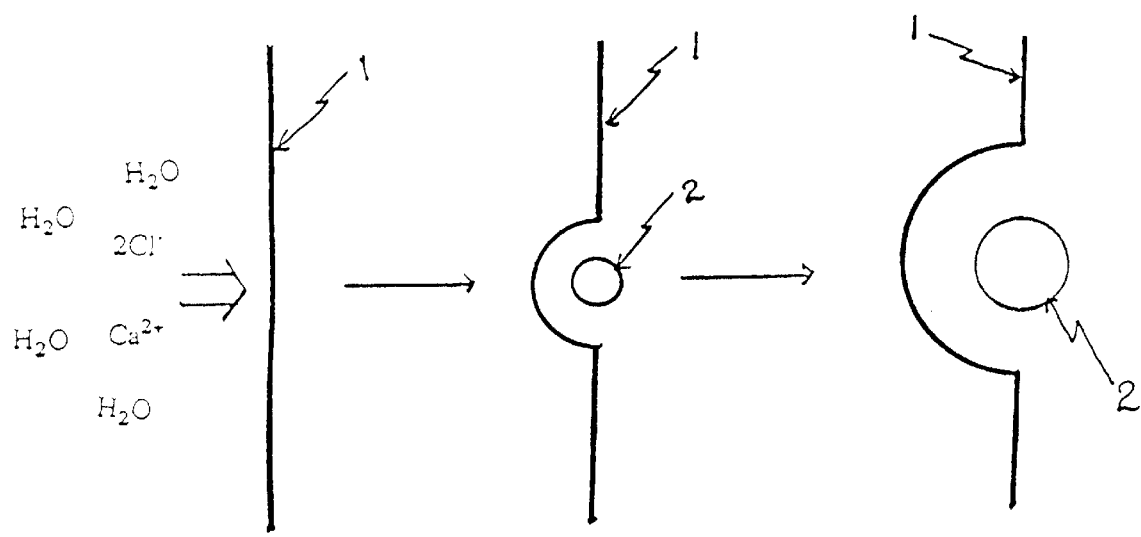

POLYSULFONE BASED HOLLOW FIBER MEMBRANE, AND A PROCESS FOR PREPARING THE SAME

BACKGROUND OF THE INVENTION

1. Field of the Invention

The present invention relates to a polysulfone based hollow fiber membrane and a process for preparing the same.

A large number of researches on the material of a separation membrane which has selective permeability had been made, and celluloses, polyamides, polyacryls and polyvinyls have been developed for the membrane material and practically are in use. These materials, however, have drawbacks such as bio-compatibility, chemical resistance, and heat resistance. In order to prevent these drawbacks, studies on adopting resins used for engineering plastics as separation membrane have been made, and engineering plastic resin like polysulfone based resin is in use as a material of a separation membrane. Since the polysulfone based resin has excellent properties such as bio-compatibility, chemical resistance, heat resistance, flame resistance, and mechanical characteristics, it is widely used as a membrane material for hemodialysis, micro filtration, ultra filtration, reverse osmosis, and gas separation.

Generally speaking, polysulfones hollow fiber membrane is produced by spinning the spinning dope composed of polysulfones resin, organic solvent and additives such as water soluble polymer, and internal coagulating liquid into air through a biannular spinning nozzle to obtain an extrudate in the form of a hollow fiber, and then coagulate the said extrudate by external coagulating liquid.

In the process of producing the said spinning dope, m-cresol, N-methyl-2-pyrrolidone, dimethyl sulfoxide, dimethyl acetamide, dimethyl formamide and/or the mixture thereof are used for solvent.

Water soluble polymer is selected from polyethylene glycol, polyvinyl alcohol, polyvinyl pyrrolidone and/or the mixture.

Though water is usually used for both internal and external coagulating liquid, water solution comprising the said additives could be used for both internal and external coagulating liquid.

2. Description of the Prior Art

In respect to the membrane, in general, the most important two properties are (1) the capability of eliminating more than a certain molecular weight of a separation material (hereinafter called "separation capability"), and (2) permeability, but these two properties are not mutually compatible: if the separation capability goes up, then the permeability goes down relatively, and if the permeability needs to be increased, then the separation capability cannot but be lowered. Therefore, an important task of developing a membrane is to produce a membrane which has a certain separation capability and higher permeability at the same time.

First of all, in order to improve the permeability of a membrane, many large pores should be formed in the membrane. In addition, in order to elevate the separation capability of a membrane while it maintains a certain permeability, the size of the pores formed in the membrane must be similar.

Up to the present date, several methods, adding water soluble polymer, solvent and/or alcohol compound in the internal coagulating liquid and/or external coagulating liquid, have been in use for form pores in a membrane. These methods, however, cannot support the formation of similar size pores so as to meet the required certain level of separation capacity and permeability in a hemodialysis membrane.

In the mean time, if the said water soluble polymer added in spinning dope, remains quite a lot in the hollow fiber membrane after the spinning process, the permeability, without deterioration in separation capability, shall be improved because of the elevated hydrophilicity of the hollow fiber membrane. In fact, after the spinning process, most of the water soluble polymer leaks to the outside of the hollow fiber membrane during the coagulating and washing processes, and there remains a little in the inside of the hollow fiber membrane because of its high solubility to water.

U.S. Pat. No. 5,340,480 discloses that a water solution containing polyvinyl pyrrolidone shall be applied as an internal coagulation liquid in order to leave polyvinyl pyrrolidone (hereinafter called "PVP"), the water soluble polymer, in the surface of the hollow fiber membrane for improvement of permeability, but the efficiency is insignificant.

Japanese Patent Laid-Open No. 58-104940 discloses use of a cross linkage agent for fixing a water soluble polymer to the surface of a polysulfone hollow fiber membrane, but the process and operation is very complicated.

Japanese Patent Laid-Open Nos. 63-97205 and 63-97634 disclose use of heat treatment or radiant rays treatment for fixing a water soluble polymer to the surface of a polysulfone hollow fiber membrane, but the process is complicated and it requires expensive equipment.

Therefore, in order to improve the separation capability and permeability of the membrane at the same time, the following techniques have been required to be developed:

1. A technique to form similar size pores in the membrane, and
2. A technique simply and effectively to leave the water soluble polymer which was added in the spinning dope, in the hollow fiber membrane.

The present invention relates to a process for producing a polysulfone based hollow fiber membrane having an excellent separation capability, permeability and high water permeable coefficient by forming many similar-sized pores in a polysulfone based hollow fiber membrane and by leaving a lot of PVP, the water soluble polymer, in the inside of the membrane.

SUMMARY OF THE INVENTION

The present invention relates to a polysulfone based hollow fiber membrane mainly in use for hemodialysis, and a process for preparing the same.

More particularly, the present invention relates to a process of producing a polysulfone based hollow fiber membrane characterized by using an internal coagulating liquid and/or an external coagulating liquid containing diethylene glycol (hereinafter called "DEG") and/or a salt which can form a hydrate in the process of producing the polysulfone based hollow fiber membrane by the following steps:

(a) Extrude a spinning dope comprising polysulfone based resin, organic solvent and PVP into air through a biannular spinning nozzle to obtain an extrudate in the form of a hollow fiber, (b) Simultaneously inject an internal coagulating liquid into the biannular spinning nozzle at the inside bore thereof, and (c) Subsequently introduce said extrudate to an external coagulating liquid.

The present invention also relates to a polysulfone based hollow fiber membrane characterized in that the water permeable coefficient is at least 0.15 ml/minute/kgf/cm$^2$, the cytochrome-C rejection rate is at most 30%, and the myoglobin rejection rate is at least 80%.

Also the present invention relates to a polysulfone based hollow fiber membrane characterized in that water permeable coefficient is at least 0.01 ml/minute/kgf/cm$^2$, cytochrome-C rejection rate is at least 80%, and vitamin $B_{12}$ rejection rate is at most 50%.

The properties of the polysulfone based hollow fiber membrane of the present invention are dependent on the quantity of DEG and salt which can form a hydrate contained in internal and/or external coagulating liquid.

BRIEF DESCRIPTION OF THE DRAWINGS

FIG. 1 is a rough schematic drawing, expressing the mechanism of forming a pore in the hollow fiber membrane when $CaCl_2$ solution is applied for internal coagulating liquid and/or external coagulating liquid of the present invention. In FIG. 1, the line 1 indicates the surface of a membrane, and the hydrate of $CaCl_2$ is shown by the numeral 2.

DETAILED DESCRIPTION OF THE INVENTION

More concretely, the present invention is explained as follows. First of all, spinning dope is prepared by dissolving polysulfone based resin in organic solvent and PVP is added to the said organic solvent. In the process of preparing spinning dope, other additives could be added thereto. The polysulfone based resin in the present invention has a recurring unit represented by the following formula (I) or (II).

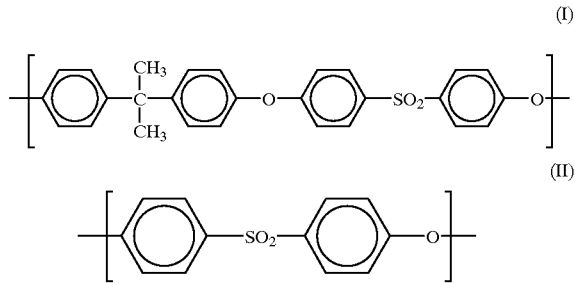

As for organic solvent, m-cresol, N-methyl-2-pyrrolidone, dimethyl sulfoxide, dimethyl acetamide, dimethyl formamide and/or the mixture thereof are applied.

Inorganic salt, alcohol compound, polyethylene glycol, and polyvinyl alcohol, could be used for additives selectively.

It is desirable that the said spinning dope is composed of 10~50 weight % of polysulfone based resin, 20~89 weight % of organic solvent, and 1~30 weight % of additives comprising PVP. But, the present invention does not specifically restrict the component ratio of spinning dope.

The next step is to prepare the polysulfone based hollow fiber membrane by spinning the said spinning dope and internal coagulating liquid through a biannular spinning nozzle to obtain an extrudate, and coagulating the extrudate in an external coagulating liquid, and washing, and winding.

The biannular spinning nozzle has an outside and inside diameter of 0.35 mm and 0.15 mm.

During the spinning process, the polymer is extruded at the speed of 2.5 g/minute, and an air gap is maintained about at the level of 10 cm. Internal coagulating liquid and/or external coagulating liquid is applied in the above said process—in other words, at least one out of the internal coagulating liquid and external coagulating liquid—has to use a solution comprising DEG, or a salt which can form a hydrate, or DEG and salt which can form hydrate at the same time. More preferably, at least one out of the said internal coagulating liquid and external coagulating liquid shall be a water solution containing DEG, a water solution containing salt which can form a hydrate, or the water solution compound thereof. The said salt which can form hydrate is $CaCl_2$, $ZnCl_2$, $MgSo_4$, $Na_2SO_4$, and the most desirable one is $CaCl_2$.

During the passing through process of the hollow fiber membrane before coagulating of the spinning dope, $CaCl_2$, $MgSO_4$, $Na_2SO_4$ and the like existing in the said internal coagulating liquid and/or external coagulating liquid exist in a hydrated precipitation status because of hydrophobicity thereof (e.g. the hydrophobicity of the membrane itself) and accelerate to form pores in the aforesaid membrane.

The pores in this process function as a kind of pore core; it grows to a certain size until the membrane coagulates completely. Consequently, the number of pores shall be increased, and the size also shall be similar. In this process, if coagulation deferring materials of the membrane (e.g.: dimethylformamide) are added with $CaCl_2$, it is possible to enlarge the pores to a desired size, since the said pore is getting bigger so much that it defers the coagulation. However, the uniformity of pores becomes somewhat deteriorated. Therefore, it is possible to selectively add membrane coagulating deferring material such as dimethylformamide in the internal coagulating liquid and/or external coagulating liquid which depends on the separation material.

In the mean time, if a water solution containing salt which cannot form a hydrate like NaCl, is applied to the internal coagulating liquid and/or the external coagulating liquid, salt in the coagulating liquid cannot pass through the membrane because of a repulsion force originated in the hydrophobicity of the spinning dope.

However, a salt which can form a hydrate like the present invention, makes it possible to remove the said repulsion force, which is somewhat like static electricity, by the hydration of salt. As a result, it is possible to pass through the membrane.

Meanwhile, in the case of an internal coagulating liquid and/or external coagulating liquid, wherein DEG was not contained, most of the PVP is leaked to the outside of the hollow fiber membrane during the coagulating and washing processes after spinning because of its high solubility in water.

That is to say, a little amount of PVP, which has not yet migrated to the outside of the polymer matrix during the said polysulfone based polymer is rapidly coagulated in the process of spinning and coagulation, and remains inside the hollow fiber membrane.

Especially, as the surface of said membrane is directly contacted with the external coagulating liquid and is coagulated rapidly, relatively much of the PVP remains in the surface rather than the inside of the membrane.

In the present invention, DEG contained in the internal coagulating liquid and/or external coagulating liquid deteriorates the solubility of PVP to coagulating liquid and water, and elevates the affinity with polysulfone based resin at the same time, causes an increase in the remaining quantity of PVP in the polysulfone based hollow fiber membrane.

A complex is made by hydrogen bond between the functional group of pyrrolidone and the —OH functional group of DEG.

Once the complex of PVP and DEG is formed as aforesaid, the solubility of PVP in the coagulating liquid and water is decreased, and then a large quantity of PVP is caused to remain in the inside of the polysulfone based hollow fiber membrane.

In that case, the said complex is not formed, and the hydrophilic part of PVP remains in the polymer matrix and is aggregated in the inside of the matrix; while the hydrophobic part of PVP remains in the polymer matrix and is aggregated in the outside thereof by hydrophobicity itself of the polysulfone based resin. As a result, the separation process becomes difficult.

Like the present invention, however, if the internal coagulating liquid and/or external coagulating liquid contains DEG, the above said problem can be solved because of the complex made by PVP and DEG. In the present invention, it is possible to produce various polysulfone based hollow fibers having various properties by controlling the DEG content or salt content which can form a hydrate added in the internal coagulating liquid and/or external coagulating liquid, and ultimately by controlling the pore size and the content of hydrophilic material which remains in the inside of the membrane.

More concretely, if the DEG content of the internal coagulating liquid and/or external coagulating liquid is less than 90 weight %, or if the salt content which can form a hydrate is less than 40 weight %, the permeability, or so called water permeable coefficient is decreased to some extent, but the separation capability becomes improved. In this case, the said produced polysulfone based hollow fiber membrane has the following properties:

at least 0.01 ml/minute/kgf/cm$^2$ of water permeable coefficient, at least 80% of Cytochrome-C rejection rate, and at most 50% of Vitamin $B_{12}$ rejection rate.

In the mean time, if the DEG content of internal coagulating liquid and/or external coagulating liquid is at least 90 weight %, or if the salt content which can form a hydrate is at least 40 weight %, a permeability, or so called water permeable coefficient becomes improved, but the separation capability is decreased to some extent. In this case, the said produced polysulfone based hollow fiber membrane has the following properties:

at least 0.15 ml/minute/kgf/cm$^2$ of water permeable coefficient, at most 30% of Cytochrome-C rejection rate, and at least 80% of Myoglobin rejection rate.

Because of a polysulfone based hollow fiber membrane produced in the process of the present invention has many similar-sized pores, it has an excellent permeability and separation capability at the same time.

The fact that the pores formed in the membrane are similar, can be learned by the big difference of the respective rejection rates in measuring two kinds of separation material which have different molecular weights.

Because a polysulfone based hollow fiber membrane produced in the process of the present invention has higher hydrophilicity, it has a relatively excellent permeability comparing to other membranes which have a similar rejection rate (in other words, which have similar pore size). That is to say, the effectiveness of the separation process is improved without deteriorating the separation capability due to its' elevated permeability.

As it is possible to reject material selectively in a desired size from a solution, wherein several materials have been mixed, the polysulfone based hollow fiber membrane of the present invention can be applied very effectively to the medical fields like use in an artificial kidney.

Water permeable coefficient and separation material rejection rate according to the present invention are measured in the following manner:

Evaluation of Water Permeable Coefficient

Prepare a small glass tube like a module by filling 20 ply of hollow fiber (length:15 cm) and then calculate the water permeability (ml/minute/kgf/cm$^2$) in maintaining the pressure of a membrane in-between at 1 kgf or so.

Evaluation of Separation Material Rejection Rate

Measure the concentration of separation material in a water solution as to before and after permeating a hollow fiber membrane, and then calculate the separation material rejection rate by the following equation.

$$\text{Separation Material Rejection Rate (\%)} = \frac{A - B}{A} \times 100$$

In the above equation, A is the concentration of separation material in a water solution before permeating a hollow fiber membrane, and B is the concentration of separation material in a water solution after permeating the hollow fiber membrane.

More concretely, the present invention is illustrated through the following examples and comparative examples. It is not intended, however, to restrict the scope of the present invention, only to following examples:

EXAMPLE 1

A spinning dope is prepared from components: 17 weight % of polysulfone resin (P-3500:product of Amoco Co.), 10 weight % of polyvinyl pyrrolidone, and 9 weight % of polyethyleneglycol added to 64 weight % of dimethylformamide, to produce a transparent spinning dope by mixing and dissolving the said components.

The said spinning dope is extruded through an external nozzle of a biannular spinning nozzle having a 0.35 mm outside diameter, and a 0.15 mm inner nozzle diameter at a speed of 2.5 g/minute, and simultaneously a $CaCl_2$/water solution (30 wt %/70 wt %), is extruded and the internal coagulating liquid is passed through the internal nozzle out of the said biannular spinning nozzle at a speed of 2.4 g/minute. After passing through the said extruded hollow fiber into a 10 cm air gap, the polysulfone hollow fiber is prepared by coagulating and washing, in water (external coagulating liquid), and winding at a speed of 50 m/minute. The polysulfone hollow fiber membrane is produced by introducing the aforesaid polysulfone hollow fiber in a module. The result of measurement for separation capability and permeability of the produced polysulfone hollow fiber membrane is shown at Table 2.

EXAMPLES 2~6, AND COMPARATIVE EXAMPLE 1~4

A polysulfone hollow fiber membrane is produced in the same process and condition as Example 1, except the changes of composition to the internal coagulating liquid and/or external coagulating liquid are as shown in Table 1. Results of measurement for separation capabilities and permeabilities of the produced polysulfone hollow fiber membranes are shown Table 2.

TABLE 1

Production Composition

|  | Internal Coagulating Liquid | External Coagulating Liquid |
|---|---|---|
| Example 1 | CaCl$_2$/water Solution (30 wt %/70 wt %) | Water |
| Example 2 | CaCl$_2$/water Solution (30 wt %/70 wt %) | CaCl$_2$/water Solution (30 wt %/70 wt %) |
| Example 3 | DEG/water Solution (80 wt %/20 wt %) | Water |
| Example 4 | DEG/water Solution (80 wt %/20 wt %) | DEG/water Solution (80 wt %/20 wt %) |
| Example 5 | DEG/water Solution (95 wt %/5 wt %) | Water |
| Example 6 | CaCl$_2$/DEG/Water Solution (4 wt %/90 wt %/6 wt %) | Water |
| Comparative Example 1 | Methanol | Water |
| Comparative Example 2 | polyethylene glycol/water Solution (70 wt %/30 wt %) | Water |
| Comparative Example 3 | Dimethylform amide/water Solution (60 wt %/40 wt %) | Water |
| Comparative Example 4 | Dimethylform amide/water Solution (70 wt %/30 wt %) | Water |

TABLE 2

Result of measurement for separation capability and permeability

|  | Vitamin B12 Rejection Rate(%) [Molecular Weight: 1,300] | Cytochrome-C Rejection Rate(%) [Molecular Weight: 12,400] | Myoglobin Rejection Rate(%) [Molecular Weight: 18,800] | Water Permeable Coefficient [ml/min/kgf/cm$^2$] |
|---|---|---|---|---|
| Example 1 | 40 | 97 | — | 0.015 |
| Example 2 | 35 | 98 | — | 0.016 |
| Example 3 | 41 | 90 | — | 0.025 |
| Example 4 | 30 | 85 | — | 0.025 |
| Example 5 | — | 20 | 80 | 0.25 |
| Example 6 | — | 15 | 85 | 0.21 |
| Comparative Example 1 | 70 | 92 | — | 0.0082 |
| Comparative Example 2 | 60 | 91 | — | 0.0093 |
| Comparative Example 3 | — | 15 | 40 | 0.1 |
| Comparative Example 4 | — | 5 | 10 | 0.2 |

Though all Cytochrome-C (molecular weight 12,400) rejection rates of the polysulfone hollow fiber membrane produced in the manner of examples 1~4, and comparative examples 1~2 are more than 80%, examples 1~4 have better permeabilities than those of comparative examples 1~2 due to higher water permeable coefficients.

In addition, though all Cytochrome-C (molecular weight 12,400) rejection rates of the polysulfone hollow fiber membrane produced in the manner of examples 5~6, and comparative examples 3~4 are less than 30%, examples 5~6 have better selectivity than comparative examples 3~4 due to higher water permeable coefficients, and higher difference of rejection rates between the two materials which have different molecular weights.

Polysulfone based hollow fiber membranes of the present invention not only have excellent permeability due to formation of many similar size pores or more existence of hydrophilic material but they also have excellent separation capability due to similar size pores with a higher water permeable coefficient than other hollow fiber membranes which have similar size pores.

What is claimed is:

1. A process which comprises producing a polysulfone based hollow fiber membrane wherein an internal coagulating liquid and/or an external coagulating liquid is formed from a water solution containing diethylene glycol or its mixture with a salt which can form a hydrate in the process of producing the polysulfone based hollow fiber membrane, said process including the following steps:
    (a) extruding a spinning dope composed of a polysulfone resin, organic solvent and polyvinyl pyrrolidone into air through a biannular spinning nozzle having an inside bore, to obtain an extrudate in the form of a hollow fiber,
    (b) simultaneously injecting said internal coagulating liquid into the biannular spinning nozzle at the inside bore thereof, and
    (c) subsequently introducing said extrudate to said external coagulating liquid.

2. The process of producing a polysulfone base hollow fiber memberance according to claim 1, wherein the said salt which can form a hydrate, is a member selected from the group consisting of CaCl$_2$, MgSO$_4$, and Na$_2$SO$_4$.

3. A process of producing a polysulfone based hollow fiber membrane according to claim 1, wherein the said polysulfones resin is polysulfone resin or polyethersulfone resin.

4. A polysulfone based hollow fiber membrane characterized by water permeable coefficient is at least 0.01 ml/minute/kgf/cm$^2$, cytochrome-C rejection rate is at least 80%, and vitamin B12 rejection rate is at most 50%.

5. A polysulfone based hollow fiber membrane characterized by the water permeable coefficient is at least 0.15 ml/minute/kgf/cm$^2$, cytochrome-C rejection rate is at most 30%, and myoglobin rejection rate is at least 80%.

* * * * *